United States Patent [19]

Dyer

[11] 4,321,975
[45] Mar. 30, 1982

[54] SLURRY DIVERTER

[76] Inventor: Ronald S. Dyer, Rte. 125, Barrington, N.H. 03825

[21] Appl. No.: 155,068

[22] Filed: Jun. 2, 1980

[51] Int. Cl.³ ............................................. E21B 33/03
[52] U.S. Cl. .................... 175/206; 175/209; 166/84; 277/177
[58] Field of Search ............. 175/66, 209, 206, 210; 166/77, 82, 84; 15/210 B; 277/152, 159, 177, 182, 184

[56] References Cited

U.S. PATENT DOCUMENTS

| | | | |
|---|---|---|---|
| 2,255,829 | 9/1941 | Spang et al. | 166/82 X |
| 2,927,774 | 3/1960 | Ormsby | 175/210 X |
| 3,045,769 | 7/1962 | Feucht et al. | 175/211 |
| 3,173,502 | 3/1965 | Overby | 175/210 |
| 3,811,518 | 5/1974 | Kalaf et al. | 175/209 X |
| 3,965,998 | 6/1976 | Gyongyosi et al. | 175/209 |

*Primary Examiner*—Ernest R. Purser
*Attorney, Agent, or Firm*—Strimbeck, Davis & Soloway

[57] ABSTRACT

A slurry diverter for use in well drilling of the type having a canister surrounding the drill shaft containing at least one compression ring member adapted to surround the drill shaft, having an O-ring-like outer portion and a thinner inwardly protruding lip portion adapted to contact the drill shaft so as to prevent the escape of slurry upwards on the drill shaft and divert such slurry through a slurry exit pipe held onto the diverter by quick release members which pipe extends away from the drill site to a diffuser held thereto also by quick release means.

6 Claims, 3 Drawing Figures

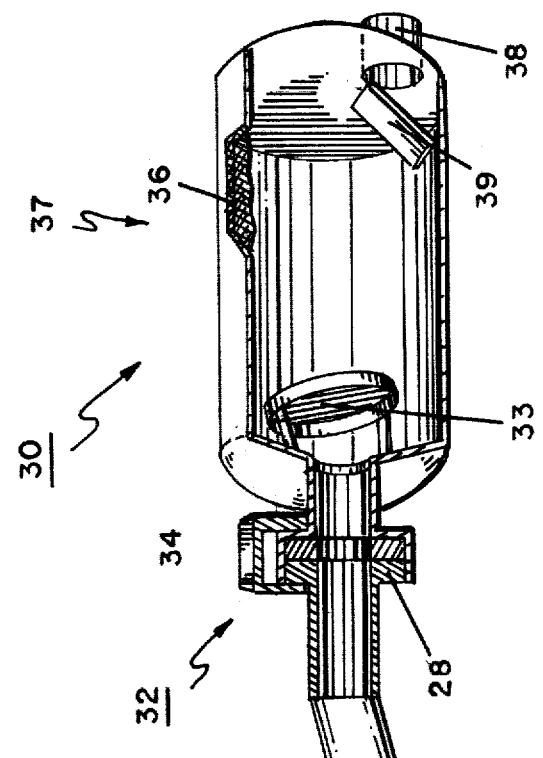
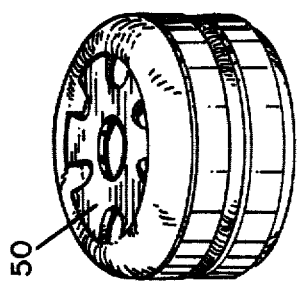
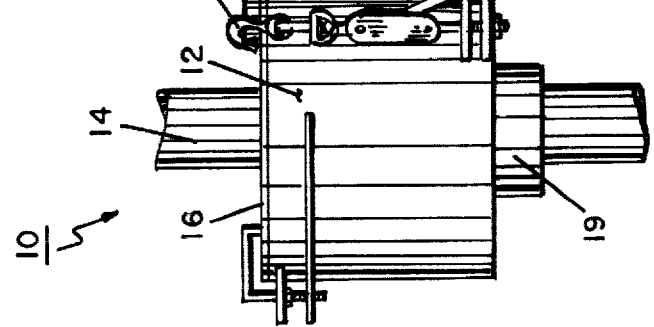

SLURRY DIVERTER

BACKGROUND OF THE INVENTION

1. Field of the Invention

The device of this invention is a slurry diverter for use in well drilling operations and more particularly relates to a slurry diverter for use in water well drilling using comparatively low water/air pressure.

2. History of the Prior Art

In drilling water wells at present a slurry emanates from the drill hole under pressure which causes dirt to blow into the air around the drill shaft creating a high level of particulate matter in the air which gets into the surrounding machinery and lowers the lifespan of compressors and other expensive equipment. At present in the oil drilling field slurry diverters are used in drilling rigs encountering significantly higher pressures than in water well drilling. Water in both water and oil well drilling enters down through the drill shaft and out the drill bit to lubricate and kill the dust in the drilling area. Air pressure is also introduced down through the drill shaft to activate the bit and to cause the water to rise back up the outside of the drill shaft carrying with it the drilling debris thereby clearing the drill hole. In oil well drilling slurry diverters have a series of thick rubber washer-like gaskets which tightly compress against the drill shaft. Beneath these gaskets the slurry is contained in a secondary chamber and forces its way out through a pipe to another area where its release will not interfere with the work being done at the drill site. In the slurry diverter used in the oil drilling industry, the rubber gaskets are circular and fit around the drill shaft like ring members with their entire inner surface thickness contacting the drill shaft. They are further compressed from the top and bottom so as to be squeezed to expand against and exert very high pressure on the drill shaft to prevent the escape therebetween of slurry under high pressure from below. In order to utilize such slurry diverter for a water well drilling, the drill shaft must be suspended and lowered in exact vertical registration with the opening in the slurry diverter which alignment can take many hours.

SUMMARY OF THE INVENTION

The device of this invention provides a slurry diverter designed to hold back the air/water/dirt slurry from escaping from the drill hole at the well drilling site. This invention allows a great tolerance in drill shaft movement during set up so that the drill shaft need not be in perfect vertical alignment with the aperture in the slurry diverter. As much as a 1.5 inch play is allowed for in setup which significantly cuts down the setup time of the drilling rig. The design of the low pressure slurry diverter of this invention utilizes a series of compression ring members separated by baffles from one another above a base plate within a canister member. The drill shaft runs centrally through the canister member and is contacted by the compression rings. The slurry comes up the drill hole around the outside of the drill shaft into the slurry chamber beneath the base plate and is prevented from rising further up the drill shaft by the compression ring members and exits out a slurry pipe. The slurry is carried 10-15 feet away from the drill site to a slurry diffuser which separates the air from the water allowing the water to drain away or be measured. The compression ring members of this invention are critical and unique. They are comprised of an outer O-ring-shaped member having an inwardly extending thin flexible lip which extends toward and makes contact with the drill shaft. It has been found that the thick rubber washer-like members for work under high compression such as are utilized in the oil drilling industry are not necessary in water well drilling due to the fact that lower air pressures are used. When this factor is taken into consideration along with the new design for the compression ring members herein, the increased amount of tolerance for play in the entry of the drill shaft into the slurry diverter of this invention makes the apparatus highly desirable due to the decrease in drill setup time. The use of spider slips can convert this unit to one able to withstand the higher pressures such as encountered in oil drillings.

Another advantage to the slurry diverter of this invention is that the slurry pipes are attached to the canister by quick release clamps which are gravity-held. These clamps eliminate the need for screw threading and allow the slurry diverter to be set up quickly.

A new and novel diffuser element is affixed at the end of the exit pipe. In this diffuser, the water enters a chamber and strikes a diverter plate which then causes the water to splash back downward against the curved lower front portion of the diffuser chamber. The air exits out the top of the chamber while the water which has fallen to the bottom of the chamber exits out the chamber pipe. The diffuser is attached to the slurry pipe by a second quick release gravity-held fitting.

BRIEF DESCRIPTION OF THE DRAWINGS

FIG. 1 illustrates a perspective view of the slurry diverter, exit pipe, quick release attachments, and diffuser of this invention.

FIG. 3 illustrates the use of spider slips in the canister of this invention.

DESCRIPTION OF THE PREFERRED EMBODIMENT(S)

Figure 2:
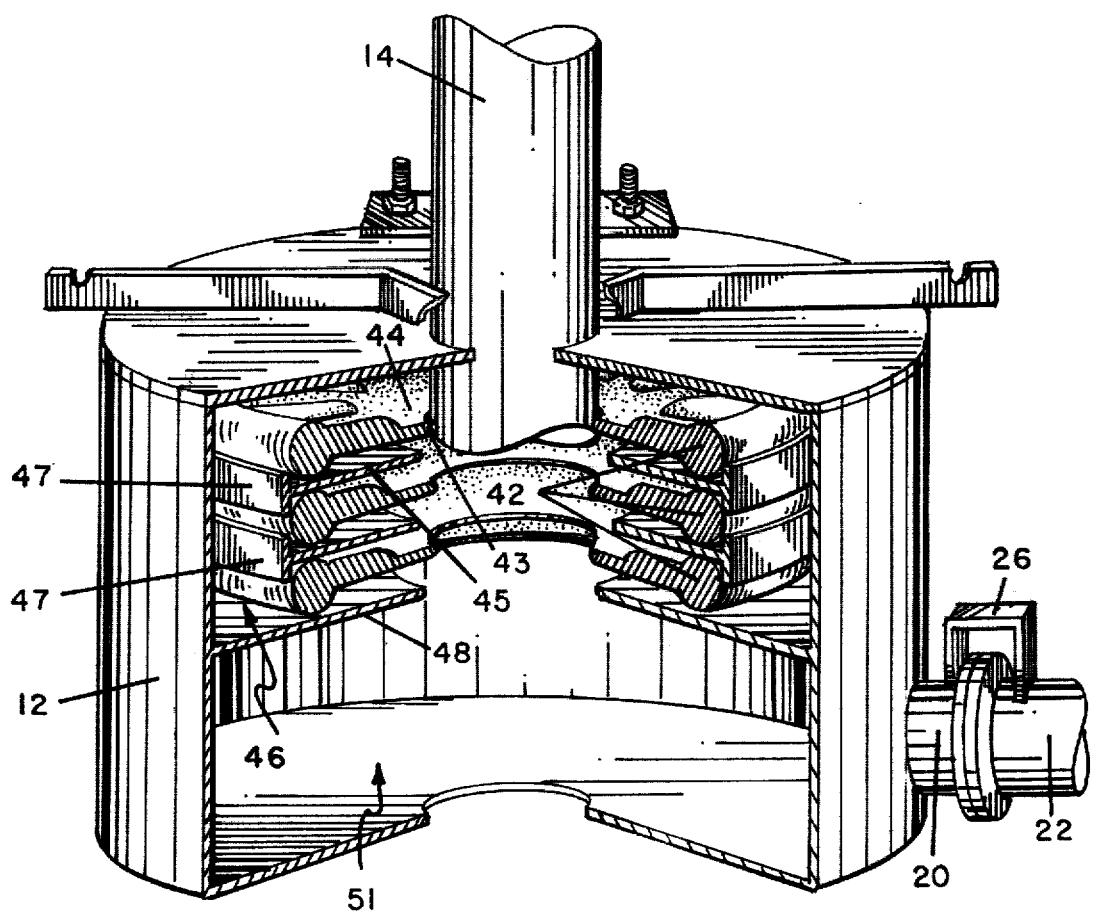
FIG. 2 illustrates a cutaway interior view of the slurry diverter canister.

FIG. 1 illustrates a perspective view of slurry diverter 10 of this invention. Seen in this view is canister 12, the insides of which are shown in FIG. 2 and described in detail below. Seen in FIG. 1 is drill shaft 14 entering into the top of canister 12 and exiting out the bottom thereof into the ground. A cover member 16 is seen which is held down by toggle clamps 18. Cover member 16 may be hinged, but any suitable cover member which has an opening in the top surface to allow the drill shaft to pass therethrough would be sufficient. A flange member 19 around the drill shaft below the canister can also be utilized. This flange may engage the drill hole pipe by threading or by resting thereon. At the base of the canister to one side is exit pipe 20. Slurry pipe 22 has a wide flange 25 at the end thereof, and a quick release catch member 26 is adapted to catch over flange 23 on exit pipe 20 thereby holding the slurry pipe 22 in tight contact with the exit pipe 20 on canister 12 without the necessity of screwing it thereon. Flange 23 fits tightly into female flange 25 on the slurry pipe against a rubber-like ring member 24 contained in flange 25. Slurry pipe 22 extends horizontally for a distance of approximately 3 feet and then upwards at an angle for approximately 7 feet, and then extends horizontally for approximately 2 feet. At the end of this slurry pipe is a second flange 28 which is adapted to be hooked onto by the quick release attachment of diffuser 30 so that it too does not have to be screwed into position. Diffuser 30 consists of a chamber into which the slurry is blown under pressure. A quick release fitting 32 affixing the diffuser to its slurry pipe 22 is seen in FIG. 1. The quick release member includes hook member 34 which is adapted to hook around flange 28 and to hold the diffuser 30 in position. Both the quick release portion of the interconnection of the slurry pipe to the canister and to the diffuser include a female flange having a recess adapted to contain a compressible rubber-like ring member adapted to receive the smaller male flange thereagainst. The levered weight of the pipe and diffuser press the flange against this ring forming a watertight seal. Diverter 30 has a water deflector 33 held at an angle to the slurry flow to force the water back against the lower curved front portion of its casing for separation of the air and water. At the opposite end of diffuser 30 is air exit 37 at the top thereof with screen 36 positioned thereover. Water outlet 38 is located at the rear base of diffuser 30 for the drainage of the water to an appropriate place and has an air deflector plate 39 disposed at an angle in front thereof to assist in the separation of the air and water.

FIG. 2 illustrates a detailed cutaway view of the inside of canister 12 of the slurry diverter. In this view is seen a cross-section of compression rings 42. A compression ring 42 is O-ring-like in its outer portion with an inner lip-like member 44 extending around on its inside adapted to extend somewhat into the area where shaft 14 passes through so that it made contact with the shaft. The rubber of the lip is softer and more pliable than the rubber in the O-ring portion. Such compresion rings are manufactured by Skinner Bros. and are used in the trade as drill pipe wipers. As the shaft passes downward, the compression ring's lip is bent in a downward position as seen in this view where shaft 14 is shown partially inserted at the top contacting the first compression ring 43. Shaft 14 is shown cut off at that point for purposes of illustration. The remaining two compression ring lips extend in a straight outward position awaiting contact with the shaft if it were moved to a lower position. Separating each compression ring member 42 is separator member 46 which has a washer-like base 45 and a surrounding band 47. The inner aperture of separator member 46 is wider than the drill shaft. Separator member 46 acts to keep the compression rings apart from one another. The circumference of the separator member is about 1 inch smaller in diameter than the inner circumference of the canister allowing the separators and the compression rings to move laterally. Further the bands 47 retain the compression rings between the separators but do not extend vertically a sufficient distance to contact one another. In a preferred embodiment the canister contains three compression rings separated by two separators. The need for three rings is created by the distance required between the first and third rings to span the indentations found in drilling rods. At the base of the bottommost compression ring is base plate 48 beneath which is slurry chamber 51 in which the slurry coming up around the outside of the drill shaft first enters and then because it cannot travel up beyond the compression rings, passes through the exit pipe 20 and out slurry pipe 22 away from the drill site so that its ultimate exit will not cause damage to any of the compressors or to other valuable equipment located at the drill site.

This unit does not rely on pressure from above or below the compression ring members to force them against the drill shaft but relies on the unique shape of the compression ring members against the drill shaft for stopping the upward pressure of the slurry flow. Further, the play in the lateral movement of the compression rings around the drill shaft opening in the canister allows for at least a 1.5 inch clearance for easy alignment of the drill shaft with the slurry diverter when setting the drill up. In an alternate embodiment, ⅜ inch thick steel spider slips 50 as seen in FIG. 3 may be used to fill the gaps between the compression rings and the separators preventing displacement of the lips of the compression rings thereby making the diverter usable in drilling situations involving higher pressure such as oil or gas drilling. Spider slips 50 should be used with a cover having a smaller drill shaft opening than the opening in the cover one would need in water well drilling.

Although the present invention has been described with reference to particular embodiments, it will be apparent to those skilled in the art that variations and modifications can be substituted therefor without departing from the principles and spirit of the invention.

I claim:

1. An improved slurry diverter for use in well drilling of the type having canister containing members to prevent the escape of slurry around the drill shaft at the drill site with slurry exit means provided below such members to transport said slurry away from the drill site wherein the improvements comprise:
    at least two rubber-like compression ring members having an aperture defined therein, said ring member adapted to surround said drill shaft, said ring member having a circumferential O-ring-like outer portion and a thinner inwardly protruding lip portion adapted to extend at least to said drill shaft to make contact therewith when said drill shaft is placed into the central aperture defined in said compression ring; and
    means to separate compression ring members from one another comprising at least one separator member including a horizontally disposed washer-like member with a central aperture defined therein and a band member affixed to the perimeter of said washer-like member.

2. The apparatus of claim 1 further including a slurry discharge pipe adapted to be attached to said canister by quick release means, said slurry discharge pipe being adapted to extend for a sufficient distance to remove said slurry from the work area; and diffuser means affixed to the ends of said slurry pipe adapted to separate the air and water of said slurry.

3. The apparatus of claim 2 wherein said canister member includes a top affixed thereto by toggle clamps and quick release means to facilitate the removal and affixation of said slurry exit pipe to and from said canister and said diffuser to and from said slurry pipe.

4. The apparatus of claim 3 wherein said diffuser means includes a casing having a curved front portion, diverter means positioned within said casing adapted to be struck by the slurry and to deflect the slurry to a lower curved front portion of the diffuser casing and an exit pipe positioned within said casing for the escape of fluid therefrom and means for the escape of air therefrom when separated from said fluid portion of said slurry.

5. The apparatus of claim 1 further including at least two spider slips, one located above and one below a compression ring member to restrict its movement for use in situations of higher pressure drilling such as in oil and gas wells.

6. A slurry diverter according to claim 1 wherein the exit means includes a removable discharge pipe and an exit pipe interconnected by a quick release gravity actuated attachment comprising:

a first flange attached to said exit pipe;

a second flange attached to one end of said discharge pipe;

a gasket supported by one said flange and positioned between said flanges to receive the other said flange thereagainst;

a hook member rigidly connected to said second flange; and means associated with said canister to be engaged by said hook member so that the weight of said discharge pipe exerts leverage to compress said gasket between said flanges to form a seal to prevent the escape of slurry between said flanges.

* * * * *